US007198358B2

(12) United States Patent
Sun et al.

(10) Patent No.: US 7,198,358 B2
(45) Date of Patent: Apr. 3, 2007

(54) HEATING ELEMENT, FLUID HEATING DEVICE, INKJET PRINTHEAD, AND PRINT CARTRIDGE HAVING THE SAME AND METHOD OF MAKING THE SAME

(75) Inventors: Jiansan Sun, Singapore (SG); Vineet Sharma, Singapore (SG); Hong Choon Lee, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 245 days.

(21) Appl. No.: 10/773,388

(22) Filed: Feb. 5, 2004

(65) Prior Publication Data

US 2005/0174390 A1 Aug. 11, 2005

(51) Int. Cl.

| | |
|---|---|
| ***B41J 2/05*** | (2006.01) |
| ***G01D 15/00*** | (2006.01) |
| ***G11B 5/127*** | (2006.01) |
| ***H05B 3/00*** | (2006.01) |

(52) U.S. Cl. ............................ 347/63; 216/27; 29/611

(58) Field of Classification Search .................. 216/27; 347/56, 61–67, 87; 438/21

See application file for complete search history.

(56) References Cited

U.S. PATENT DOCUMENTS

| | | | | |
|---|---|---|---|---|
| 6,213,587 | B1 | 4/2001 | Whitman | |
| 6,513,913 | B2 | 2/2003 | Schulte et al. | |
| 6,558,969 | B2 * | 5/2003 | Miller et al. | 438/21 |
| 6,785,956 | B2 * | 9/2004 | Xu et al. | 438/21 |

OTHER PUBLICATIONS

Encyclopedia information about dielectric, 2003, Columbia University Press, The Columbia Electronic Encyclopedia, Sixth Edition, Paragraph 3. URL: http://www.answers.com, http://cc.columbia.edu/cu/cup/.*

* cited by examiner

*Primary Examiner*—Stephen Meier
*Assistant Examiner*—Lisa M. Solomon

(57) ABSTRACT

According to an embodiment of the invention, there is provided a heating element including a substrate, a conductive layer disposed over the substrate to define a first conductive trace and a second conductive trace with a spacer therebetween and a resistive layer covering the first conductive trace, the second conductive trace and the spacer wherein the resistive layer at least partially electrically connects the first and the second conductive traces.

5 Claims, 8 Drawing Sheets

HEATING ELEMENT, FLUID HEATING DEVICE, INKJET PRINTHEAD, AND PRINT CARTRIDGE HAVING THE SAME AND METHOD OF MAKING THE SAME

BACKGROUND

The present invention generally relates to a heating element, and more particularly to a thermal inkjet printhead that is suitable for use on a print cartridge. This invention further relates to a method of making the heating element.

Substantial developments have been made in the field of electronic printing technology. A wide variety of highly efficient printing systems currently exist which are capable of dispensing ink in a rapid and accurate manner. Thermal inkjet systems are especially important in this regard. Printing units using thermal inkjet technology basically involve an apparatus which includes at least one ink reservoir in fluid communication with a substrate (preferably made of silicon [Si] and/or other comparable materials) having a plurality of thin-film heating elements or resistors in firing chambers thereon. The substrate and resistors are maintained within a structure that is conventionally referred to as a “printhead”. Selective activation of the resistors causes thermal excitation of the ink materials stored inside the firing chambers and expulsion thereof from the printhead. Representative thermal inkjet systems are discussed in U.S. Pat. No. 6,213,587, Whitman, entitled “Ink Jet Printhead Having Improved Reliability”; and U.S. Pat. No. 6,513,913, Schulte et al., entitled “Heating Element of a Printhead Having Conductive Layer Between Resistive layers.”

The operating efficiency of the printhead, with particular reference to the resistors that are used to expel ink on-demand during printhead operation, is an important consideration in the design of a printhead. The term “operating efficiency” shall herein collectively encompass a number of different items including but not limited to internal temperature levels, thermal uniformity of the resistors which affects ink expulsion volume or drop weight, and the like.

The chemical and physical characteristics of the resistors and interconnection components associated therewith which are selected for use in a thermal inkjet printhead will directly influence the overall operating efficiency of the printhead. The terms “interconnection components” or “interconnection structures” as employed herein generally involve the conductive traces and related elements which electrically connect the resistors to a printing control circuitry of the system.

Known printheads include a conductive layer above a resistive layer that defines the resistors. The conductive layer has traces that have respective sloped or beveled sidewalls in direct proximity with the resistors. Such sloped or beveled sidewalls have surfaces that allow more effective deposition of one or more passivation layers thereon that are normally used to protect the resistors and adjacent components from corrosion. Therefore printhead designs have steered clear of vertical sidewalls because it is difficult to deposit the passivation layers on the surfaces of vertical sidewalls. Moreover, these vertical sidewalls form sharp corners in the printhead that are known to trap a barrier material that is used to form the ink or firing chambers above the resistors. Trapped barrier material in the firing chambers acts as a heat insulating layer that prevents heat generated by the resistors from being effectively dissipated into fluid in the respective firing chambers. This heat insulating barrier material causes heat to build up within the printhead (with particular reference to the substrate or “die” on which the printhead components are positioned), thereby affecting the printhead reliability/longevity levels. Printheads with sloped sidewall design therefore partially overcomes such a problem.

However, printheads having conductive traces with sloped sidewalls suffer from a disadvantage. The slope metal etching (SME) processes, such as wet chemical etching and dry etching, used for creating the sloped surfaces is not precisely controllable. In other words, the amount of conductive material removed from a conductive layer to form two spaced apart conductive traces flanking a resistor cannot be precisely determined. Accordingly, the distance between the two conductive traces that defines the “length” or “boundary” of a resistor cannot be precisely defined. Such a process when used to fabricate a printhead may produce inaccurately sized resistors which when used may result in inaccurate drop weights. In a worse case, the resistors of a printhead may not just be individually inaccurately sized, they may be of different sizes in the printhead. Consequently, heat generated by these resistors and thus drop weights from the various ink chambers formed over the resistors may not be uniform across the firing chambers in the printhead. Such non-uniformity in the drop weights may be a barrier to the design of higher-resolution printheads.

Thus, it is desirable to have an inkjet printhead having heating elements wherein the dimensions of resistors therein are more precisely controlled so as to achieve uniformity of drop weights throughout the heating elements.

SUMMARY

According to an embodiment of the invention, there is provided a heating element including a substrate, a conductive layer disposed over the substrate to define a first conductive trace and a second conductive trace with a spacer therebetween and a resistive layer covering the first conductive trace, the second conductive trace and the spacer wherein the resistive layer at least partially electrically connects the first and the second conductive traces.

BRIEF DESCRIPTION OF DRAWINGS

The invention will be better understood with reference to the drawings, in which.

DETAILED DESCRIPTION

Hereafter, embodiments of the present invention will be described in the context of heating elements suitable for use in a thermal inkjet printhead. However, it is to be understood that the invention is usable in any fluid heating device.

Figure 1:
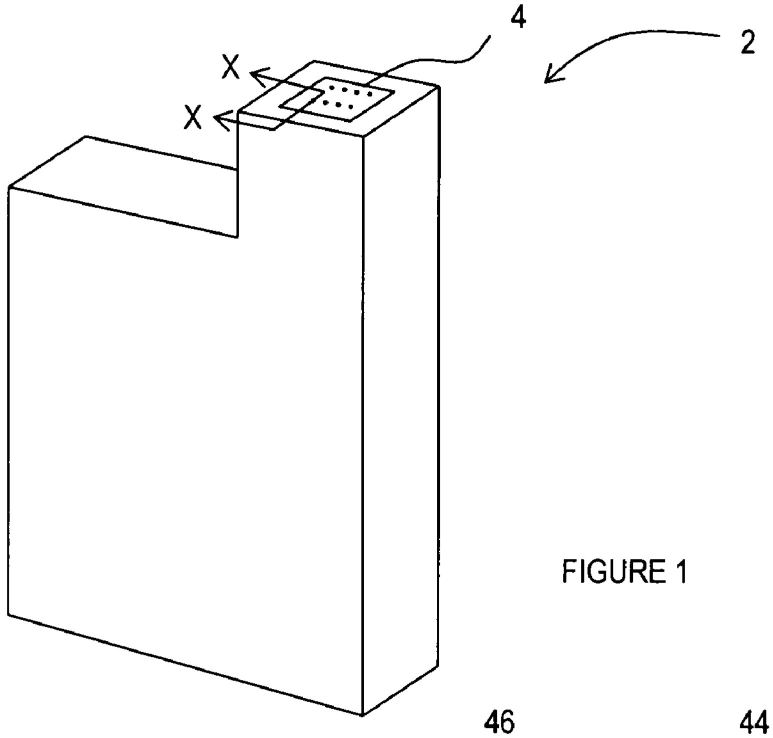
FIG. 1 is an isometric drawing of a print cartridge, having a printhead thereon, according to an embodiment of the present invention.
Figure 2:
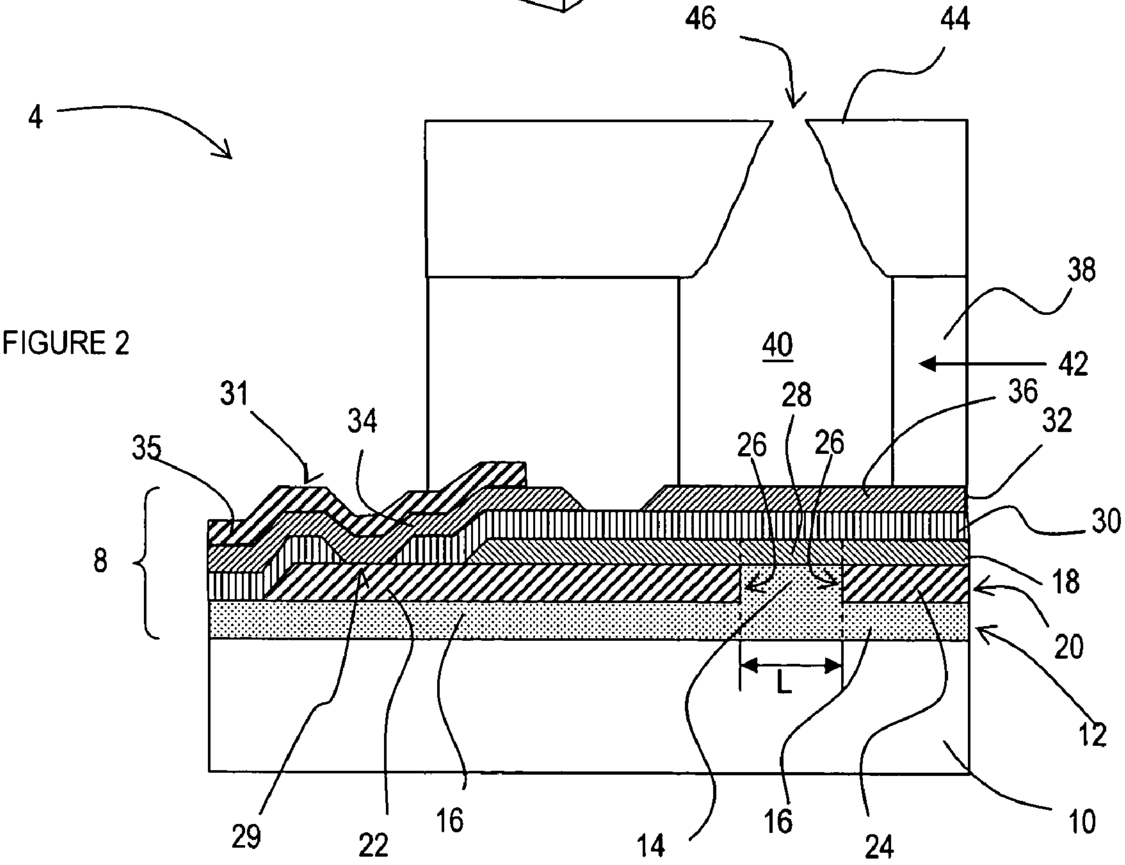
FIG. 2 is a cross-sectional drawing of a portion of the printhead in FIG. 1, taken along a line X—X in FIG. 1 according to an embodiment of the present invention.

FIG. 1 shows an inkjet print cartridge 2 with a printhead 4 thereon, according to a first embodiment of the invention. The print cartridge 2 includes a fluid reservoir (not shown), to which the printhead 4 is fluidically coupled to, for feeding fluid therein to the printhead 4. FIG. 2 shows a cross-sectional view of a portion of the printhead 4 taken along a line X—X in FIG. 1. In FIG. 2, a thin film stack 8 is applied over a substrate 10. A slot region or manifold (not shown) is formed through the thin film stack 8 and the substrate 10. One method of forming the manifold is abrasive sand blasting. A blasting apparatus uses a source of pressurized gas (e.g. compressed air) to eject abrasive particles toward the substrate coated with thin film layers to form the manifold. The particles contact to erode the coated substrate, causing the formation of an opening therethrough. Abrasive particles range in size from about 10–200 microns in diameter. Abrasive particles include aluminum oxide, glass beads, silicon carbide, sodium bicarbonate, dolomite, and walnut shells.

In the first embodiment, the substrate 10 is a monocrystalline silicon wafer. In some other embodiments, the substrate 10 may be a p-type silicon wafer that is lightly doped to approximately 0.55 ohm/cm. Alternatively, the starting substrate 10 may be glass, a semiconductive material, a Metal Matrix Composite (MMC), a Ceramic Matrix Composite (CMC), a Polymer Matrix Composite (PMC) or a sandwich Si/xMc, in which the x filler material is etched out of the composite matrix post vacuum processing. The dimensions of the starting substrate 10 may vary as is known to those skilled in the art.

In the first embodiment, an insulating or capping layer 12 of silicon dioxide is deposited or grown over the substrate 10. In this embodiment, the capping layer 12 covers and seals the substrate 10, thereby providing a gas and liquid barrier layer. Because the capping layer 12 is a barrier layer, fluid is substantially restricted from flowing into the substrate 10. In this first embodiment, the capping layer 12 is processed to include a protruding portion 14 flanked on two sides thereof by shoulder portions 16. The process for forming the protruding portion 14 and shoulder portions 16 will be described later.

In other embodiments, this capping layer 12 may be formed of a variety of different materials such as aluminum oxide, silicon carbide, silicon nitride, glass (PSG) and other suitable materials. In one of these other embodiments, the use of an electrically insulating dielectric material for the capping layer 12 also serves to electrically insulate the substrate 10. Depending on the material, the capping layer 12 may also act as a thermal barrier between the substrate 10 and a resistive layer 18 thereabove. The capping layer 12 may be formed using any one of a variety of methods known to those skilled in the art such as thermally growing the layer, sputtering, evaporation, and plasma enhanced chemical vapor deposition (PECVD). The capping layer 12 may be of any desired thickness that is sufficient to cover and seal the substrate 10. Generally, the capping layer 12 has a thickness of up to about 1 to 2 microns.

In one of the other embodiments, the capping layer 12 is a phosphorous-doped (n+) silicon dioxide interdielectric insulating glass layer (PSG) deposited using PECVD techniques. Generally, the PSG layer has a typical thickness of up to but not limited to about 1 to 2 microns. For example, this capping layer may be approximately 0.5–0.9 micron thick.

In another one of the other embodiments, the capping layer 12 is field oxide (FOX) that is thermally grown on an exposed surface of a silicon substrate 10. The FOX is grown into the silicon substrate 10 as well as deposited on top of the substrate 10 to form a total depth of approximately 1.3 microns. Because the FOX layer pulls the silicon from the substrate 10, a strong chemical bond is established between the FOX capping layer 12 and the substrate 10. In some embodiments, the capping layer 12 is a thermal oxide (TOX) layer.

In the first embodiment, a conductive layer 20 is disposed by depositing a conductive material of aluminum having a small percentage of copper, for example about 0.5%, over the protruding portion 14 and the shoulder portions 16 of the capping layer 12. In other embodiments, the conductive material is formed of at least one of a variety of different materials including aluminum, copper, gold, and aluminum with 0.5% silicon, and may be deposited by any method, such as sputtering and evaporation. Generally, the conductive layer 20 has a thickness of up to about 1 to 2 microns. In one of these other embodiments, sputter deposition is used to deposit a layer of aluminum to a thickness of approximately 0.5 micron.

The conductive layer 20 is planarized as will be described in more detail below to expose the protruding portion 14 of the capping layer 12 to thereby separate the conductive layer 20 into a first conductive trace 22 over one shoulder portion 16 of the capping layer from a second conductive trace 24 over the other shoulder portion 16 of the capping layer 12. The two conductive traces 22, 24 are separated by the protruding portion 14, which serves as a spacer. Although a single heating element is illustrated and described herein, those skilled in the art would appreciate that this pair of conductive traces have to be separated from other pairs of conductive traces (not shown) of the printhead 4 as well.

Accordingly, the same step for planarizing the conductive layer 20 to separate the two conductive traces 22, 24 of a single heating element will also separate the pair of conductive traces 22, 24 from other pairs. When planarized, the top surfaces of the conductive traces 22, 24 and the protruding portion 14 are at least substantially coplanar. The distance of the gap or opening between the two conductive traces 22, 24 is determined by the width, L, of the protruding portion 14 of the capping layer 12. Likewise, the width (not shown) of the conductor traces 22, 24 is defined by the geometry of the capping layer 12. In an exemplary embodiment the width of the conductor traces is the same as the width of the protruding portion 14. The width, L, may be approximately 10 to 30 microns. Each of the conductive traces 22, 24 at opposite ends of the protruding portion 14, has a sidewall 26 that is at least substantially vertical. Accordingly, these sidewalls 26 are at least substantially perpendicular to a top surface of the conductive layer 20.

The resistive layer 18 is disposed over the conductive layer 20 to cover the first conductive trace 22, the second conductive trace 24 and the protruding portion 14. In this manner, the resistive layer 18 defines resistors 28 between the respective pairs of conductive traces 22, 24. The resistive layer 18 and the conductive layer 20 form a two-layer stack. In other words, the resistive layer 18 and the conductive layer 20 are on two separate planes as shown in FIG. 2. The effective size of a resistor 28 is given, in the first embodiment, by a square having sides with a length, L, as defined by the width of and the distance between the pair of conductive traces 22, 24. In the first embodiment, a sputter deposition technique is used to deposit a resistive material layer of tantalum aluminum composite across the conductive traces 22, 24 to at least partially electrically connect them. An area 29 of the first conductive trace 22 is not covered by the resistive layer 18 but left exposed as shown in FIG. 2. Typically, the resistive layer 18 has a thickness in the range of about 500 angstroms to 2000 angstroms. However, resistive layers 18 with thicknesses outside this range are also within the scope of the invention. The resistive layer 18 is at least substantially uniformly thick and has a first or bottom surface that abuts the conductive traces 22, 24 and the protruding portion 14, and a second or top surface, opposite the first surface, that is at least substantially planar. In other words, the top surface of the resistive layer 18 over the conductive traces 22, 24 and the protruding portion 14 of the capping layer 12 is at least substantially planar throughout. In this first embodiment, the capping layer 12 has a higher electrical resistance than the resistive layer 18 so that an electric current flowing between the two conductive traces 22, 24 flows substantially through the resistor 28 instead of the protruding portion 14 of the capping layer 12.

A variety of other suitable resistive materials are known to those skilled in the art including but not limited to titanium nitride, titanium tungsten, titanium, a titanium alloy, a metal nitride, aluminum silicone, nickel chromium, and titanium nitride, which may optionally be doped with suitable impurities such as oxygen, nitrogen, and carbon, to adjust the resistivity of the material. The resistive layer 18 may be deposited by any suitable method such as sputtering, and evaporation.

As shown in the first embodiment of FIG. 2, an insulating passivation layer 30 of silicon carbide/nitride is formed over the resistive layer 18 and the exposed area 29 of the first conductor trace 22 to prevent electrical charging of the fluid or corrosion of the device, in the event that an electrically conductive fluid is used. The passivation layer 30 may be formed of any suitable material such as silicon dioxide, aluminum oxide, silicon carbide, silicon nitride, and glass, and by any suitable method such as sputtering, evaporation, and PECVD. Generally, the passivation layer 30 has a thickness of up to about 1 to 2 microns. The surface of the structure is masked and etched to create vias for metal interconnects 31 that are electrically connected to the first conductive traces 22.

In the first embodiment, a PECVD process is used to deposit a composite silicon nitride/silicon carbide layer 30 to serve as a component passivation layer. This passivation layer 30 has a thickness of approximately 0.75 micron. In another embodiment, the thickness is about 0.4 microns. In some embodiments, the passivation layer 30 places the layers therebelow under compressive stress.

In the first embodiment, a cavitation barrier layer 32 of tantalum is added over the passivation layer 30. The cavitation barrier layer 32 helps dissipate the lashing force of a collapsing air bubble left in the wake of each ejected fluid drop. Generally, the cavitation barrier layer 32 has a thickness of up to about 1 to 2 microns. The tantalum layer 32 is approximately 0.6 micron thick and serves as a passivation, anti-cavitation, and adhesion layer. In some embodiments, the cavitation barrier layer 32 absorbs energy away from the substrate 10 during formation of the manifold. The grain structure of the tantalum is such that the cavitation barrier layer 32 also places the layers therebelow under compressive stress. The tantalum layer 32 is sputter deposited quickly thereby holding the molecules in the layer 32 in place. However, if the tantalum layer is annealed, the compressive stress is relieved.

The cavitation barrier layer 32 is separated into a first portion 34 and a second portion 36. The first portion 34 is disposed over the first conductive trace 22 to be electrically connected therewith. The second portion 36 is disposed over the resistor 28. The first portion 34 of the cavitation barrier layer 32 is coated with a layer of gold 35. The areas of the cavitation barrier layer that are not covered by the gold will oxidize and become non-wettable by solder.

In this first embodiment, a barrier layer 38 is disposed over the exposed cavitation barrier layer 32 and partially over the gold layer 35. The barrier layer 38 has a thickness of up to about 20 microns. The barrier layer 38 is formed of a fast cross-linking polymer such as photoimagable epoxy (such as SU8 developed by IBM), photoimagable polymer or photosensitive silicone dielectrics, such as SINR-3010 manufactured by ShinEtsu™.

In other embodiments, the barrier layer 38 is made of an organic polymer plastic which is substantially inert to the corrosive action of ink. Plastic polymers suitable for this purpose include products sold under the trademarks VACREL and RISTON by E. I. DuPont de Nemours and Co. of Wilmington, Del., U.S.A. The barrier layer 38 in these other embodiments has a thickness of about 20 to 30 microns.

The barrier layer 38 is processed to define an ink or firing chamber 40 above the resistor 28 and an ink channel 42 that connects the firing chamber 40 to the manifold. Abutting the barrier layer 38 is an orifice plate 44 that is made of nickel, flexible polymer or other suitable materials. One or more orifices 46 in the orifice plate 42 are aligned with each firing chamber 40. During use, fluid is supplied through the manifold and the channel 42 to the firing chamber 40. Passage of an electric current or a "firing signal", from the first conductive trace 22 through the resistor 28 to the second conductive trace 24 causes the resistor 28 to generate heat. This heat heats the fluid in the firing chamber 40 to cause air trapped in the fluid to expand as an air bubble that explodes in the firing chamber, thereby causing the fluid to be expelled through the orifice 46.

As shown more clearly in the printhead 14 of FIG. 1, the orifices 46 are arranged in rows located on either sides of the manifold. In one embodiment, the orifices 46, and corresponding firing chambers 40 are staggered from each other across the manifold.

Figure 3:
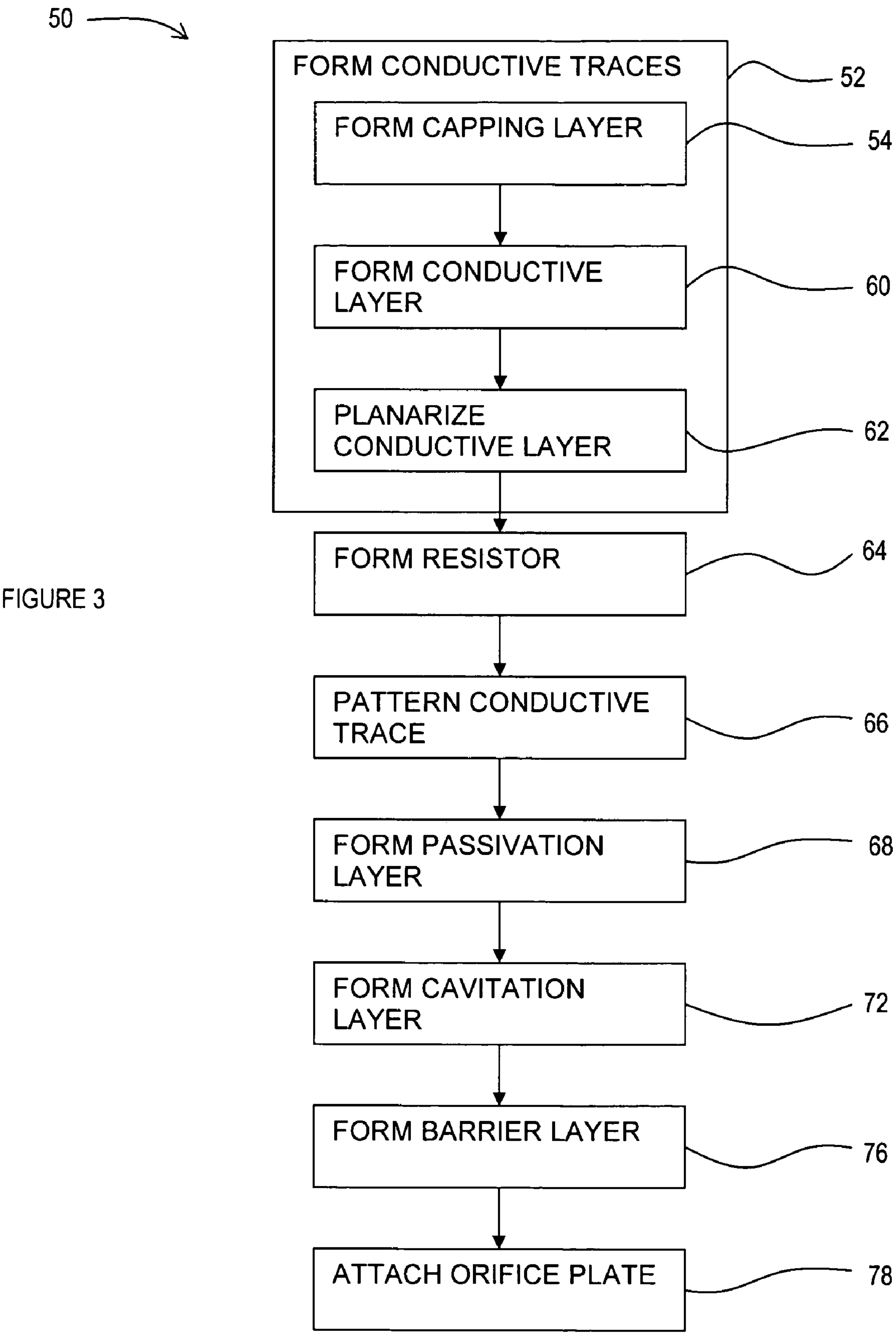
FIG. 3 is a flowchart of a sequence of steps for manufacturing the printhead in FIG. 1 according to an embodiment of the present invention.
Figure 4A:
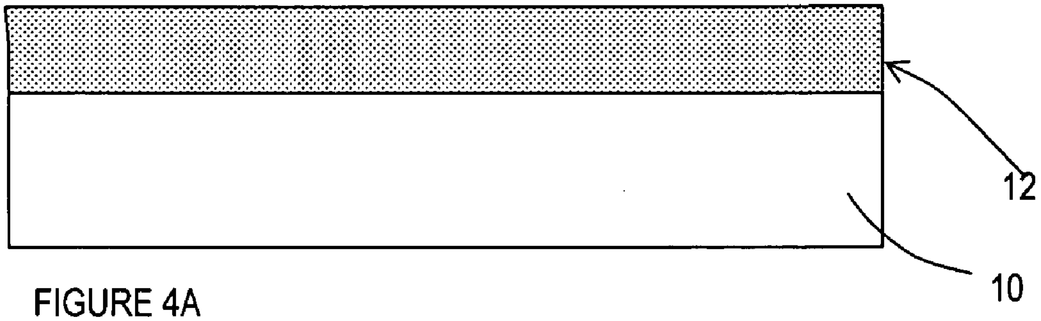
FIGS. 4A–4M are cross-sectional schematic drawings showing, in sequence, the printhead in FIG. 1 during various stages of manufacturing according to the steps in FIG. 3.
Figure 4B:
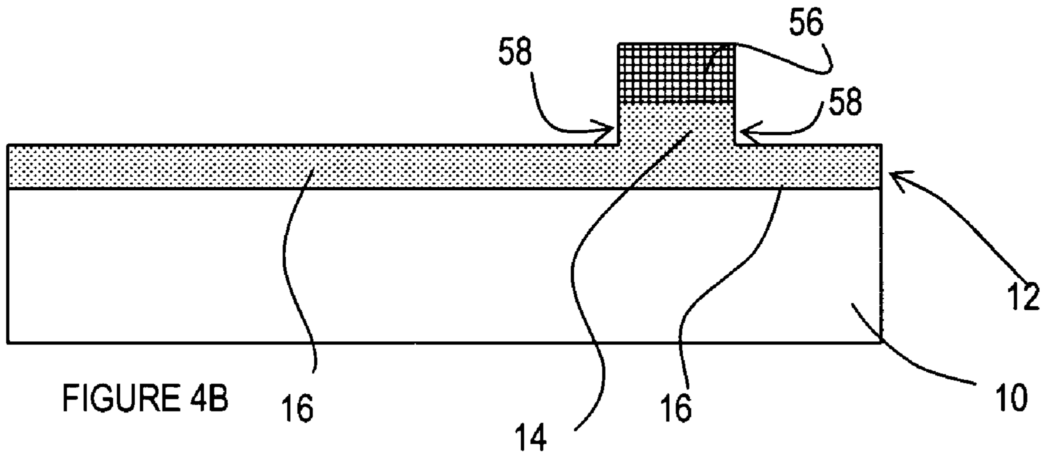

FIG. 3 is a flow chart of a sequence 50 of steps, according to one embodiment, for forming the above-described printhead 4. The sequence 50 starts in a FORM CONDUCTIVE TRACES step 52, wherein the conductive layer 20 is formed over the capping layer 12 on the substrate 10. The conductive layer 20 includes the first conductive trace 22 and the second conductive trace 24 that are separated by an insulating portion 14 as described above. Specifically, to obtain the conductive traces 22, 24 in the FORM CONDUCTIVE TRACES step 52, the sequence 50 starts in a FORM CAPPING LAYER sub-step 54 using a photolithographic process. In this sub-step 54, the capping layer 12 is formed or deposited over the substrate 10 as shown in FIG. 4A. Next a layer of photoresist material 56 is deposited over the capping layer 12. The layer of photoresist material 56 is exposed to light through a first mask (not shown) having a first pattern thereon. The photoresist material 56 is then developed to form the first pattern in the capping layer 12. Selected portions (not shown) of the layer of photoresist material 56 are washed away. Material of the capping layer that is not covered by the photoresist material is removed using a dry plasma etch, which is a conventional gaseous etch technique. FIG. 4B shows the structure of the capping layer 12 after etching. The non-etched, area forms the protruding portion 14 of the capping layer 12 and the etched areas form the shoulder portions 16. The sidewalls 58 of the protruding portion 14 are at least substantially vertical to surfaces of the shoulder portions 16. Next, the photoresist material is then stripped from the top of the protruding portion 14 of the capping layer 12 to complete the forming of the capping layer 12.

The above-mentioned photolithographic process is described in more detail next. The negative photoresist material 56 is a chemical substance rendered insoluble by exposure to light. Areas that are unexposed to light are washed away during development of the photoresist layer. Accordingly, the first mask has a substantially non-transparent area and a substantially transparent or open area (both not shown). The former area corresponds to the shoulder portions 16 of the capping layer 12 and the latter area corresponds to the protruding portion 14 of the capping layer 12. The non-transparent area may be made of chrome. When this non-transparent area of the mask is placed over the photoresist material 56, and the photoresist material 56 is exposed to light, the area under non-transparent area is unexposed and can be washed away. The open area is an opening in the mask through which the light exposing the photoresist material passes through. The photoresist material under the open area substantially hardens (or is rendered insoluble) in response to the light. The layer of photoresist material 56 along with the capping layer 12 is etched using a dry etch. After etching, the protruding portion 14 and the shoulder portions 16 are defined as shown in FIG. 4B.

Alternatively, the photoresist material may be a positive photoresist material. Opposite to the negative photoresist material described above, the positive photoresist material that is not exposed to light is rendered insoluble, while the material that is exposed to light is washed away. A mask used with positive photoresist that is similar to the first mask has, for example, the non-translucent and the translucent areas switched to achieve the same etching effect of the capping layer 12.

Figure 4C:
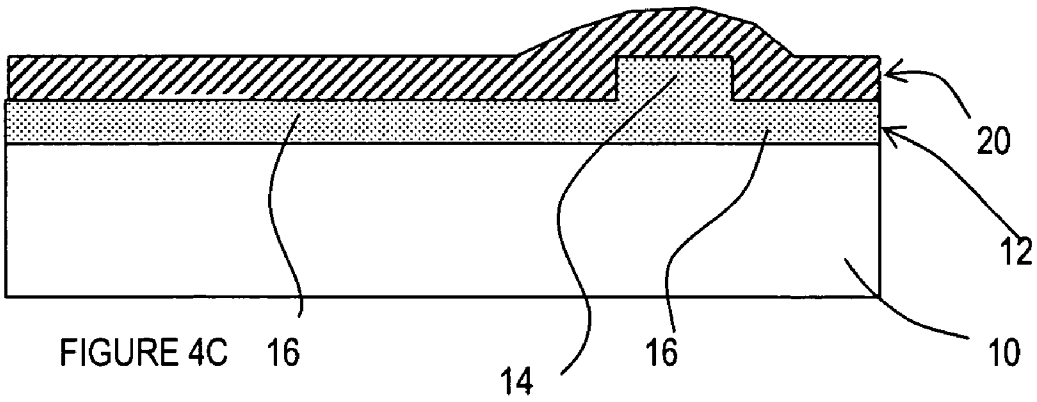

After the FORM CAPPING LAYER sub-step 54, the sequence 50 next proceeds to a FORM CONDUCTIVE LAYER sub-step 60, wherein conductive material, as described above, is deposited on the etched capping layer 12 to form the conductive layer 20 thereon. The conductive layer 20 is deposited to cover the entire top surface of the capping layer 12. In other words, the conductive layer 20 is deposited to cover the top surfaces of the protruding portion 14 and the shoulder portions 16 as shown in FIG. 4C. When deposited in this manner, the top surface of the conductive layer 20 is non-planar, being higher at a location above the protruding portion 14 of the capping layer 12 than the surrounding areas.

Figure 4D:
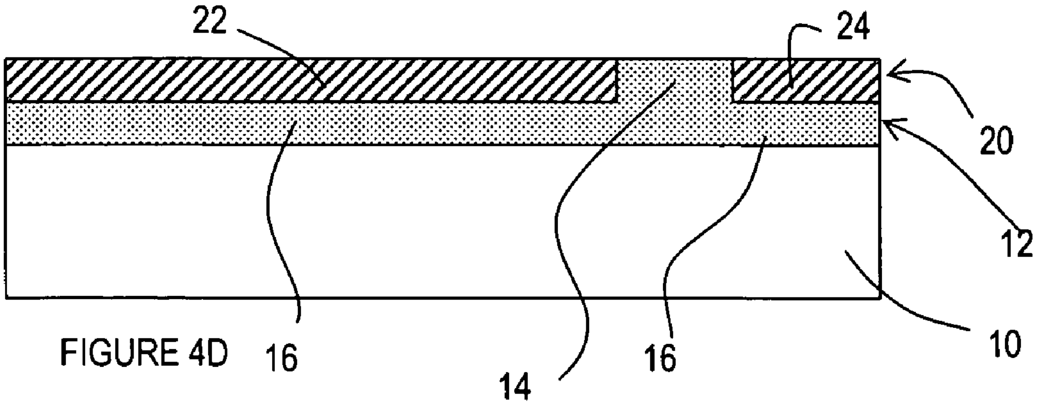

The sequence 50 next proceeds to a PLANARIZE sub-step 62, wherein the top surface of the conductive layer 20 is planarized using but not limited to chemical mechanical polishing (CMP). Alternatively, an etch back process may be used to planarize the conductive layer 20. However, in some cases, such an etch back process produces a surface that follows the original topography of the surface prior to planarizing. The surface of the conductive layer 20 is planarized until the protruding portion 14 of the capping layer 12 is exposed to leave the layer of conductive material 20 only on the shoulder portions 16 of the capping layer 12 as shown in FIG. 4D. This remaining conductive material forms the first and the second conductive traces 22, 24. When planarized in this manner, the top surface of the conductive layer 20 is at least substantially coplanar with the top surface of the protruding portion 14 of the capping layer 12.

Figure 4E:
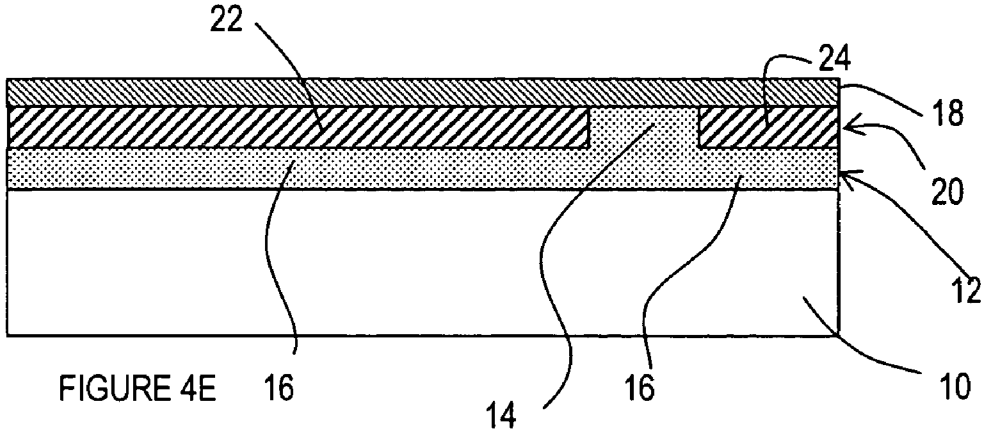
Figure 4F:
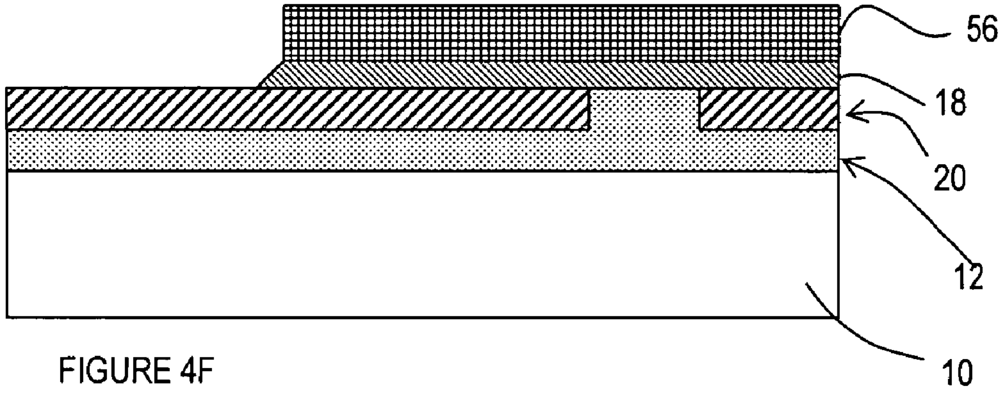

After the FORM CONDUCTIVE TRACES step 52, the sequence 50 proceeds to a FORM RESISTOR step 64, wherein resistive material is deposited on the planarized surface to form the resistive layer 18 thereon as shown in FIG. 4E. The resistive layer 18 is patterned and etched to expose a part of the first conductive trace 22 thereunder as shown in FIG. 4F. Specifically, a photoresist material 56 is deposited over the resistive layer 18, masked using a second mask, exposed and developed to a second pattern on the second mask, using the photolithographic process as described above. The resistive layer 18 and photoresist material 56 are then etched using either dry or wet etch to leave the structure as shown in FIG. 4F. The photoresist material 56 deposited over the resistive layer 18 is then removed before the deposition of a next layer on the structure. The photoresist material initially covers the entire top surface of the resistive layer 18. The pattern on the second mask is a pattern that defines the top surface of the resistive layer 18 that is to remain for straddling the first and second conductive traces 22, 24 after etching. During etching, the area of the resistive layer 18 that is not covered with the photoresist material 56 is etched away.

Figure 4G:
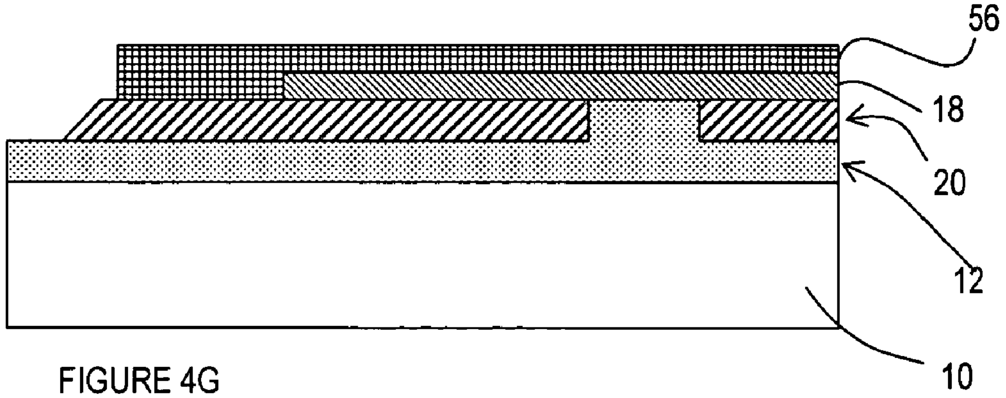

The sequence 50 next proceeds to a PATTERN CONDUCTIVE TRACE step 66, wherein the exposed conductive trace 22 is patterned and etched to remove an end portion of the first conductive trace 22. FIG. 4G shows the first conductive trace 22 that is remaining after etching. Specifically, a photoresist material 56 is deposited over the resistive layer 18 and the exposed portion of the first conductive layer 22, masked using a third mask, exposed and developed to a third pattern on the third mask, using a photolithographic process as described above. The first conductive trace 22 and photoresist material 56 are then etched using either dry or wet etch to leave the structure as shown in FIG. 4G. The photoresist material 56 deposited over the resistive layer 18 and the first conductive trace 22 is then removed before the deposition of a next layer on the structure.

Figure 4H:
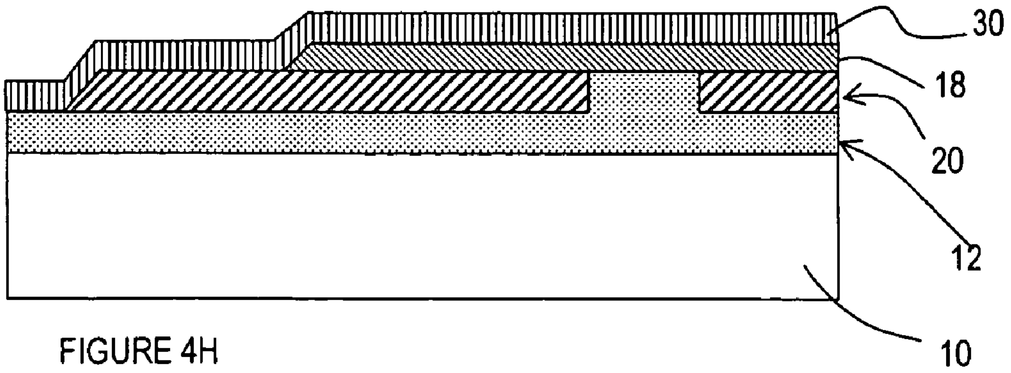
Figure 4I:
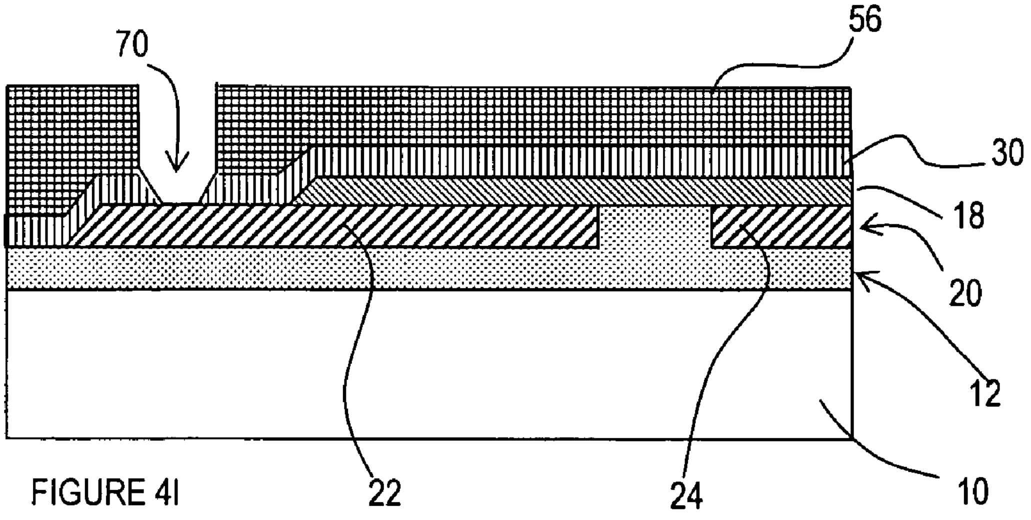

The sequence 50 next proceeds to a FORM PASSIVATION LAYER step 68, wherein the passivation layer 30 is deposited on a top surface of the structure of FIG. 4G to produce the structure as shown in FIG. 4H. The passivation layer 30 is patterned and etched to remove a portion thereof so as to define a through hole 70 through which a portion of the underlying first conductive trace 22 is exposed. FIG. 4I shows the through hole 70 etched through the passivation layer 30 to expose the first conductive trace 22. Specifically, a photoresist material 56 is deposited over the passivation layer 30, masked using a fourth mask, exposed and developed to a fourth pattern on the fourth mask, using the photolithographic process described above. The passivation layer 30 is then etched using either dry or wet etch to leave the structure as shown in FIG. 4I. The photoresist material 56 deposited over the passivation layer 30 is then removed before the deposition of a next layer on the structure.

Figure 4J:
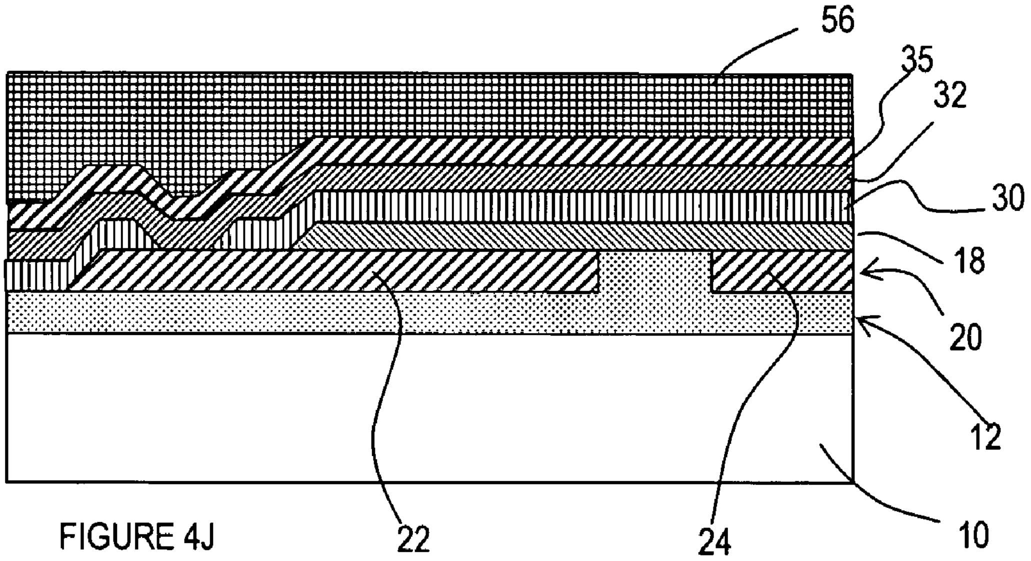

The sequence 50 next proceeds to a FORM CAVITATION LAYER step 72, wherein the cavitation layer 32, followed by the gold layer 35, are deposited on a top surface of the structure of FIG. 4I (with the photoresist material removed) to produce the structure as shown in FIG. 4J. The cavitation layer 32 covers the through hole 70 to come into contact with, to be thereby electrically connected to, the exposed first conductive trace 22 therein. Similarly, the cavitation layer 32 is patterned using a fifth mask and etched to remove a portion thereof so as to separate, and thus electrically insulate, the first portion 34 and the second portion 36 of the cavitation layer 32 as shown in FIG. 4K.

Figure 4K:
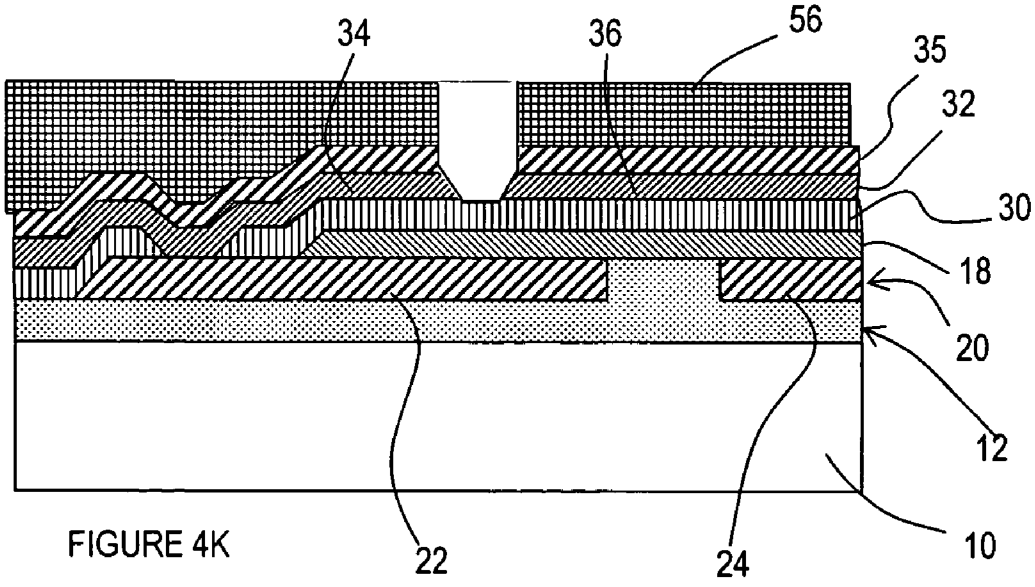
Figure 4L:
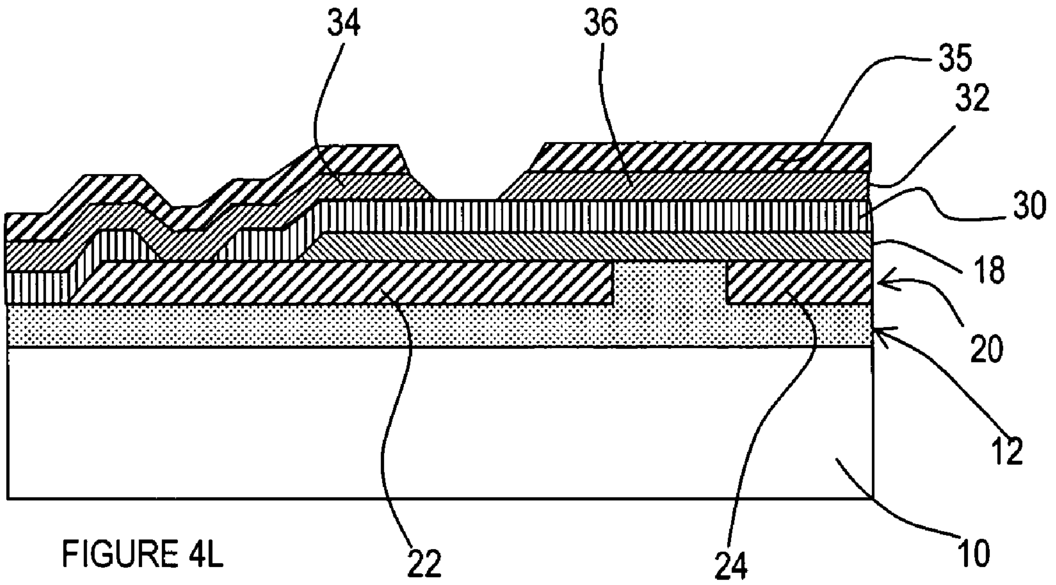
Figure 4M:
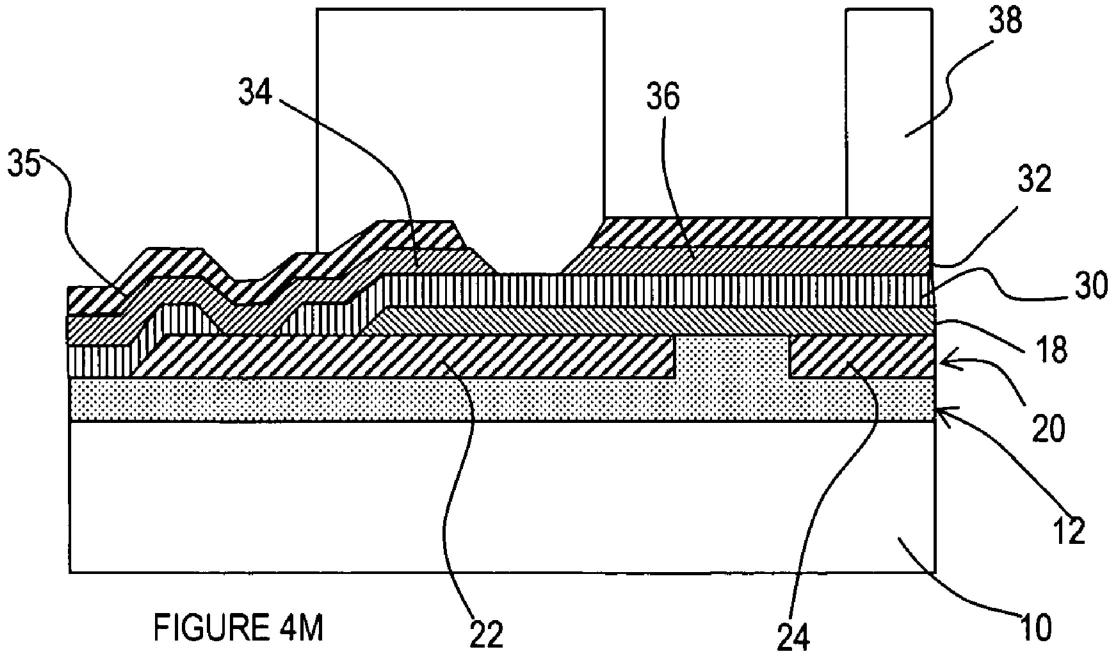

The sequence 50 next proceeds to a FORM BARRIER LAYER step 76, wherein the barrier layer 38 is deposited on a top surface of the thin-film structure of FIG. 4L (which is similar to FIG. 4K but with photoresist material 56 removed). The barrier layer 38 is processed using the above described photolithographic process to define the firing chamber 40, the ink channel 42 and alignment structures, if required for aligning with the orifice plate 44.

The sequence 50 finally ends in an ATTACH ORIFICE PLATE step 78, wherein an appropriate amount of adhesive is applied on the top surface of the barrier layer 38. Next, the orifice plate 44 is placed over the barrier layer 38 with the aid of a conventional vision system or other suitable systems. Subsequently, a stake-and-bake process is used to bond the orifice plate 44 to the barrier layer 38. In the stake-and-bake process, pressure is applied to the orifice plate 44 to hold the orifice plate 44 in place over the barrier layer 38. This pressure has the tendency to correct any misalignment in the placement of the orifice plate 44 over the barrier layer 38.

Figure 5:
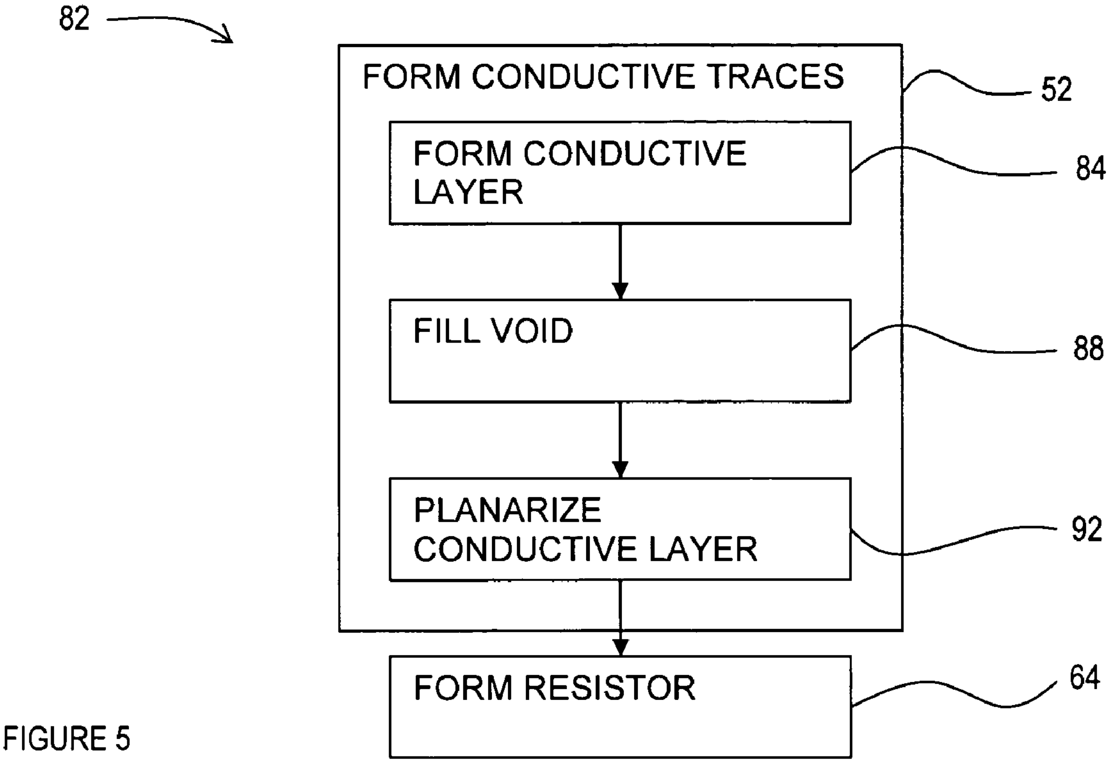
FIG. 5 is a flowchart of a sequence of steps for manufacturing a heating element according to another embodiment of the invention.
Figure 6A:
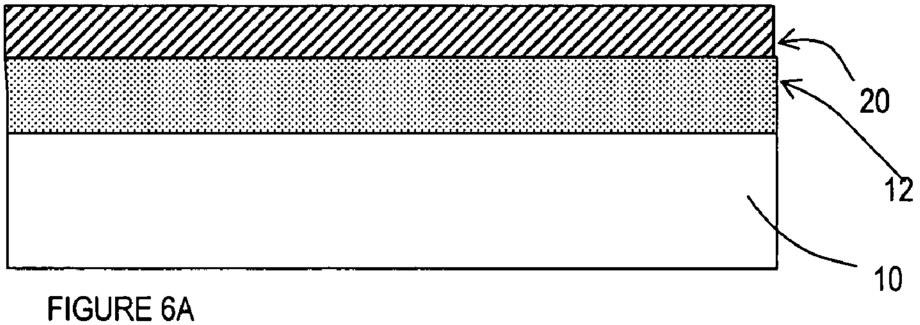
FIGS. 6A–6E are cross-sectional schematic drawings showing, in sequence, the heating element in FIG. 5 during various stages of manufacturing according to the steps in FIG. 5.
Figure 6B:
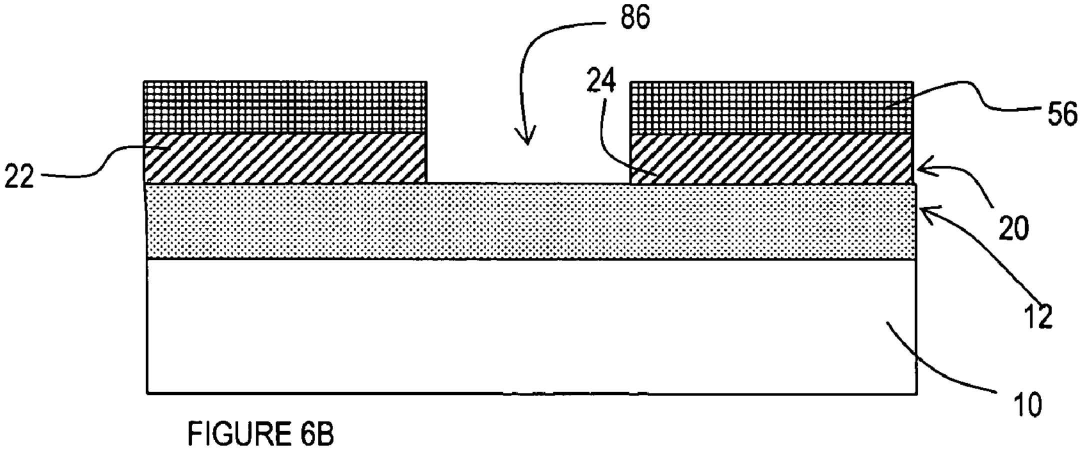

A heating element 80 (FIG. 6E) according to a second embodiment of the invention is next described with the aid of FIGS. 5 and 6A–6D. FIG. 5 is a flow chart showing a sequence 82 of steps for fabricating the heating element 80. The sequence 82 starts in a FORM CONDUCTIVE LAYER sub-step 84 of a FORM CONDUCTIVE LAYER step 52, wherein a conductive layer 20 is formed over a capping layer 12 on a substrate 10 as shown in FIG. 6A. Next, a portion of the conductive layer 20 is removed using a photolithographic process as described above to obtain the structure shown in FIG. 6B. As can be seen in FIG. 6B, the conductive layer 20 is separated into a first conductive trace 22 and a second conductive trace 24. The first and second conductive traces 22, 24 are separated by a void 86 therebetween to be electrically insulated from each other.

Figure 6C:
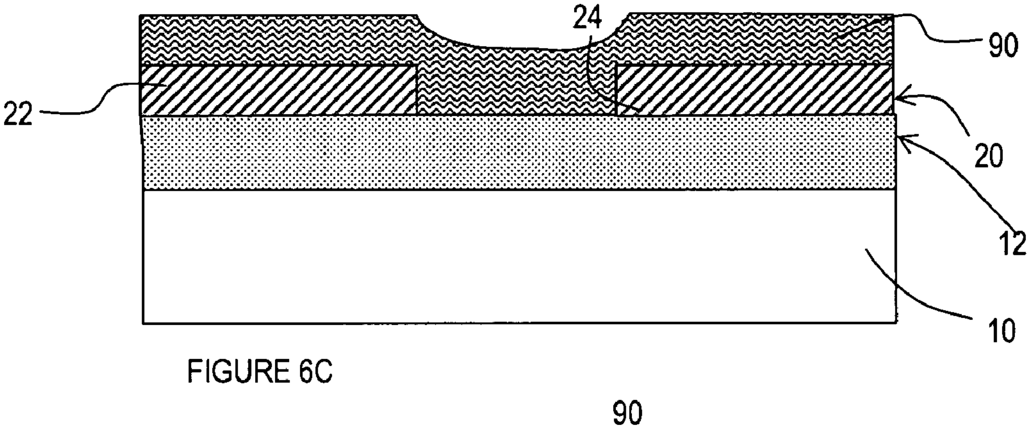
Figure 6D:
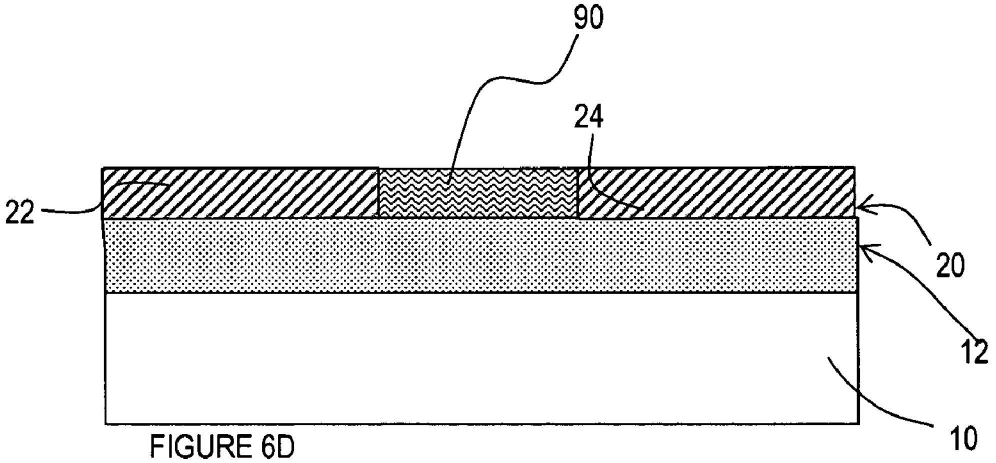
Figure 6E:
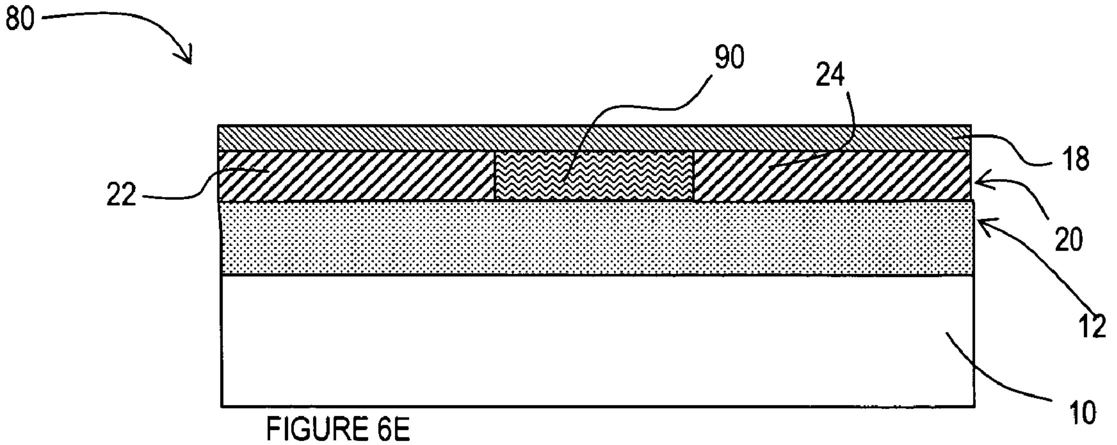

The sequence 82 next proceeds to a FILL VOID sub-step 88, wherein the void 86 is completely filled with a filler material 90 which serves as a spacer between the two conductive traces 22, 24. The filler material 90 may be deposited using PECVD. The filler material 90 may be any suitable electrically insulating material such as but not limited to silicon oxide based materials, glasses, silicon nitride and hybrid sol gel. The silicon oxide based materials includes borophosphosilicate glass (BPSG), phophosilicate glass (PSG) and tetraethylorthosilicate (TEOS). FIG. 6C shows the entire top surface of the conductive layer 20 covered by the filler material 90. The sequence 82 next proceeds to a PLANARIZE sub-step 92, wherein the top surface of the filler material 90 is planarized, such as by CMP, to expose the first and the second conductive traces 22, 24. When such a step 92 is completed, the filler material 90 has a surface facing away from the substrate 10 that is at least substantially coplanar with adjacent surfaces of the first and second conductive traces 22, 24 flanking the filler surface as shown in FIG. 6D. The sequence 82 ends in a FORM RESISTOR step 64, wherein a resistive layer 18 that is at least substantially uniformly thick is deposited over the planarized surface using physical vapor deposition. The resistive layer is of a material with a lower electrical resistance than the filler material. The steps starting from the PATTERN CONDUCTIVE TRACE step 66 in the sequence 50 may be performed on the structure in FIG. 6E to form a printhead similar to that shown in FIG. 2.

Advantageously, the firing element according to the invention has a simplified, substantially planar internal printhead design (with particular reference to the resistors and associated interconnection hardware) which allows more effective coverage of these components by one or more protective layers. And since the design does not include any sloped surfaces (with particular reference to the resistors and associated interconnection), the dimensions of the resistors can be more precisely controlled and problems related to residual barrier layer material in the firing chambers are to some extent eliminated. Consequently, ink bubble nucleation in the firing chambers is more uniform compared to printhead design having sloped surfaces. The use of the proven materials for the printhead design also ensures that there are lesser problems associated with reliability/longevity of the printhead.

Although the invention is described as implemented in the above-described embodiments, it is not to be construed to be limited as such. For example, not all thin film layers described are necessary. In some embodiments, certain layers, such as the capping layer, may be dispensed with.

As another example, the conductive layer is described to have a surface, on which the resistive layer is deposited, that is at least substantially planar. Such a conductive surface may be non-planar. In such a case, a top surface of a resistive layer deposited on the non-planar surface of the conductive layer may be planarized instead to obtain a heating element according to an embodiment.

As a further example, although the spacer between the two conductive traces of the conducting layer is described above to be made of an electrically insulating material, it is to be appreciated that the spacer may be made of any material that does not short the two conductive traces or divert substantial electric current away from the resistor in the resistive layer. In other words, the spacer material may be of a resistance that is lower, the same or higher than the material of the resistive layer. Accordingly, the spacer may be of the same material as the resistive layer. As described above, the spacer material may be BPSG, PSG, TEOS, silicon nitrite and other suitable materials. Alternatively, the spacer may be an air gap between the two conductive traces. Such spacer materials will ensure that an electric current flowing from one conductive trace to the other conductive trace will flow at least partially through the resistor in the resistive layer.

We claim:

1. A method of manufacturing a heating element for a printhead, said method comprising:

forming an insulating layer on a substrate;

partially etching through the thickness of the insulating layer to define a protruding portion having substantially vertical sidewalls and flanked by two shoulder portions;

depositing a conductive layer on the insulating layer to cover the protruding portion and the shoulder portions;

planarizing a surface of the conductive layer to expose the protruding portion to thereby form a first conductive trace separate from a second conductive trace; and forming a resistive layer over the planarized surface of the conductive layer and the exposed protruding portion.

2. A method according to claim 1, wherein the resistive layer is at least substantially uniformly thick.

3. A method for manufacturing a thermal inkjet printhead, said method comprising:

forming an insulating layer on a substrate;

partially etching through the thickness of the insulating layer to define a protruding portion having substantially vertical sidewalls and flanked by two shoulder portions;

depositing a conductive layer on the insulating layer to cover the protruding portion and the shoulder portions;

planarizing a surface of the conductive layer to expose the protruding portion to thereby form a first conductive trace separate from a second conductive trace; and forming a resistive layer over the planarized surface of the conductive layer and the exposed protruding portion; and forming an ink chamber above the resistive layer.

4. The method of claim 3 further comprising:

forming a passivation layer between the resistive layer and the ink chamber, said passivation layer being made of an insulating material.

5. The method of claim 4 further comprising:

forming a cavitation barrier layer between the passivation layer and the ink chamber.

* * * * *